(12) United States Patent
Seils

(10) Patent No.: US 6,356,070 B1
(45) Date of Patent: Mar. 12, 2002

(54) SENSOR ARRANGEMENT PRODUCING ONE OUTPUT SIGNAL DEPENDING ON SENSOR INTERNAL RESISTANCE AND ANOTHER, DEPENDING ON A MEASURED VARIABLE

(75) Inventor: Wolfgang Seils, Ludwigsburg (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/341,066

(22) PCT Filed: Nov. 5, 1998

(86) PCT No.: PCT/DE98/03216

§ 371 Date: Jul. 2, 1999

§ 102(e) Date: Jul. 2, 1999

(87) PCT Pub. No.: WO99/24789

PCT Pub. Date: May 20, 1999

(30) Foreign Application Priority Data

Nov. 12, 1997 (DE) .......................................... 197 50 049

(51) Int. Cl.$^7$ ........................... G01B 7/00; G01R 33/025
(52) U.S. Cl. ................................................. 324/207.12
(58) Field of Search ........................... 324/713, 251, 324/225, 693, 721, 123 R, 126, 207.12; 323/313, 315, 312; 338/32 H; 320/143

(56) References Cited

U.S. PATENT DOCUMENTS

| | | | |
|---|---|---|---|
| 4,764,685 A | * | 8/1988 | Bleckmann et al. ......... 307/106 |
| 5,589,768 A | * | 12/1996 | Ishiyama et al. ....... 324/207.12 |
| 5,619,122 A | * | 4/1997 | Kearney et al. ............ 323/312 |

FOREIGN PATENT DOCUMENTS

| | | |
|---|---|---|
| DE | OS 44 31 045 | 8/1994 |
| EP | 0 049 304 A1 | 4/1982 |
| EP | 0 332 196 B1 | 10/1991 |

OTHER PUBLICATIONS

Product Description Sheet, Messprinzip.
E. Johansson: "New Generation of Pressducor . . . ", ASEA Journal, 45, No. 5, pp. 129–134, 1972.

* cited by examiner

*Primary Examiner*—Safet Metjahic
*Assistant Examiner*—E P LeRoux
(74) *Attorney, Agent, or Firm*—Michael J. Striker

(57) ABSTRACT

The sensor circuit arrangement includes a sensor (23; 53) that produces an alternating voltage sensor signal that varies according to a measured variable; first and second current supplying circuits (21, 51) connected to respective sensor terminals to apply first and second output voltages (U1, U2) to the respective terminals; a counter-coupling network (24, 54) coupling the current supplying circuits to provide respective constant currents to the sensor (23, 53) and a sensor signal processing circuit portion. The sensor signal processing circuit portion includes an operational amplifier (13,46) connected across the sensor terminals, a low-pass filter (20,50) connected to the operational amplifier and a capacitor (19, 46) connected to the operational amplifier to generate an alternating output signal having an amplitude depending on the magnitude of the measured variable. The low-pass filter produces a filter output signal indicative of a temperature-dependent internal sensor resistance. The sensor is at an ungrounded floating potential so that common-mode interference is compensated.

6 Claims, 1 Drawing Sheet

SENSOR ARRANGEMENT PRODUCING ONE OUTPUT SIGNAL DEPENDING ON SENSOR INTERNAL RESISTANCE AND ANOTHER, DEPENDING ON A MEASURED VARIABLE

BACKGROUND OF THE INVENTION

1. Field of the Invention

The invention relates to a sensor arrangement, comprising a sensor and an a signal processing circuit for processing the output signal of the sensor, having at least one first current source, which is connected to an operating voltage and by means of which a current is passed through the sensor.

2. Prior Art

European Patent Disclosure EP 0 049 304 A1, for instance, discloses using inductive sensors for simultaneous measurement of a travel or motion and the temperature. A sensor with at least one coil is used, and the coil changes its electrical properties as a function of the measurement variable, such as a displacement and the prevailing temperature.

In the known arrangement, an inductive spacing measuring device with a measuring coil is employed. The measuring coil is acted upon on the one hand by a high- frequency alternating current and on the other by a direct current or a low-frequency current. From the induced eddy current losses, the impedance of the coil and thus in the final analysis the position of the measuring coil can be determined.

Because of the ohmic resistance of the measuring coil, a voltage drop occurs at the coil that is further processed, with the aid of a low-pass filter, to a direct voltage value. Since the ohmic resistance of the measuring coil varies with the temperature, the voltage value is at the same time a measure of the temperature of the measuring coil and can be utilized for compensation of the actual measurement signal.

From European Patent Disclosure EP 0 332 196 B1, it is known to use an inductive sensor to measure the rotational speed, or rpm, of a wheel in an ABS-equipped vehicle brake system. The associated evaluation circuit takes into account the fact that the electromagnetic signals induced in accordance with the rpm increase considerably in both amplitude and frequency with the rpm and therefore provides suitable compensatory provisions. It is also taken into account that the internal resistance of the rpm sensor varies as a function of temperature.

To increase the accuracy of the evaluation, a temperature compensation is provided; it is proposed that either the temperature of the rpm sensor be ascertained with a separate sensor, or the temperature dependency of the internal resistance of the rpm sensor be determined in advance and stored in memory as a calibration curve in the evaluating microprocessor. There is no proposal that the rpm and temperature be measured separately. Nor is it known to use the temperature of the rpm sensor as a measure for the temperature of the brakes.

A sensor arrangement described at the outset is also known from German Patent Disclosure DE 44 31 045 A1. The known sensor arrangement is used to jointly measure two variables, in particular the rpm of a wheel and a temperature, with an inductive pickup that is disposed in the vicinity of the wheel and is influenced by the wheel. The associated evaluation circuit ascertains the rpm from the chronological spacing between pulses of the output signal of the inductive pickup. The temperature is ascertained from the voltage offset that occurs. The sensor arrangement is used as a wheel rpm sensor in a motor vehicle and is disposed in the vicinity of the brakes; a temperature dependent on the brake temperature is measured and evaluated.

Although the known sensor arrangement also provides very good results, it still has the disadvantage that its advantageous effect is typically achieved only with inductive sensors, in which the frequency of an induced or generated alternating voltage represents the measurement signal. It can therefore advantageously be used where the measurement signal by an oscillating circuit mistuning or an rpm- dependent flux, as is the case in DE 44 31 045 A1. If the measurement signal is generated by a cross coil force sensor, then the known sensor arrangement cannot be used.

SUMMARY OF THE INVENTION

The object of the invention is to provide a sensor arrangement of the type defined at the outset in such a way that it can be used to evaluate measurement signals in which the amplitude of an alternating voltage represents the measurement signal.

This object and others, which will be made more apparent hereinafter, are attained in a sensor arrangement comprising a sensor that produces an alternating voltage sensor signal dependent on a measured variable, which appears across the sensor terminals, and an evaluation circuit for evaluating the sensor signal, which has at least one current source, which is connect to an operating voltage and by means of which a current is passed through the sensor.

According to the invention the sensor circuit arrangement comprises a sensor for generating the alternating voltage sensor signal, which has an internal sensor resistance and two sensor terminals; a first current supplying circuit connected to an operating voltage and to one sensor terminal to provide a first output voltage at that sensor terminal; a second current supplying circuit connected to the operating voltage and to another sensor terminal to provide a second output voltage at that sensor terminal; a counter-coupling network connecting a control input of the first current supplying circuit and a control input of the second current supplying circuit and also connecting the sensor terminals with each other, the counter-coupling network comprising means for coupling the first and second current supplying circuit, so that the output voltages are set to respective predetermined values; and a sensor signal processing circuit portion comprising an operational amplifier having input terminals connected across the sensor terminals and an output terminal, a low-pass filter connected to the output terminal of the operational amplifier and having a filter output signal indicative of the internal sensor resistance and a capacitor connected to the output terminal of the operational amplifier and generating an alternating output signal having an amplitude representing a measured variable.

By means of the second current source, it is advantageously possible to dispose the sensor between the two current sources. Since the current of the current sources can be set by means of the countercoupling network, the output voltages of the current sources can assume predetermined values. As a result, the potential at which the sensor outputs its signal can be set. The sensor is thus no longer at a fixed potential but rather at an ungrounded, floating potential. Because of the freedom in the potential, the major advantage is attained that common-mode interference reaching a differential amplifier that amplifies the sensor signal can be compensated for.

The countercoupling network also prevents the current sources from reaching saturation, which would cause their outputs to be at either nearly the potential of the operating voltage or at ground potential. By means of the internal regulation of the countercoupling network, the circuit arrangement according to the invention has the capability not only of suppressing common-mode interference but also of improved constancy of the current. This is very favorable from the standpoint of more-accurate temperature measurement. Since the sensor is not attracted to potential on one side, short-circuit and breakaway detectors can also remain active.

Particularly in a force sensor in the form of a cross duct, whose secondary coil can be evaluated in the manner described above, the sensor arrangement of the invention has major advantages, since a cross duct has the property, given fixed wiring on one side, of having low sensitivity. If the primary side of the cross duct were also applied on one side to a fixed potential, there would be the additional risk of miscoupling. These disadvantages are avoided in a sensor arrangement embodied according to the invention.

It is especially favorable if the countercoupling network is designed such that the value of the output voltages of the current sources is approximately half the operating voltage. As a result, a very wide control range is obtained.

It has proved especially favorable that the countercoupling network carries the output voltages of the current sources each to a respective summation point in the control input of the current sources. This makes it especially easy to realize the circuitry for the internal regulation. It is also very favorable if the countercoupling network has a low-pass filter, whose limit frequency is below, or markedly below, the frequency of the alternating signal furnished by the sensor. The effect attained by the low-pass filter is that the countercoupling network allows only the low-frequency signal components for controlling the current sources to pass through to the control input of the current sources, and it blocks the higher-frequency sensor signal.

BRIEF DESCRIPTION OF THE DRAWING

Further characteristics and advantages of the present invention will become apparent from the ensuing description of a particular exemplary embodiment in conjunction with the drawing, in which Shown are FIG. 1. is a schamatic circuit diagram of a first embodiment of a sensor arrangement according to the invention.

DESCRIPTION OF THE PREFERRED EMBODIMENTS

Figure 1:
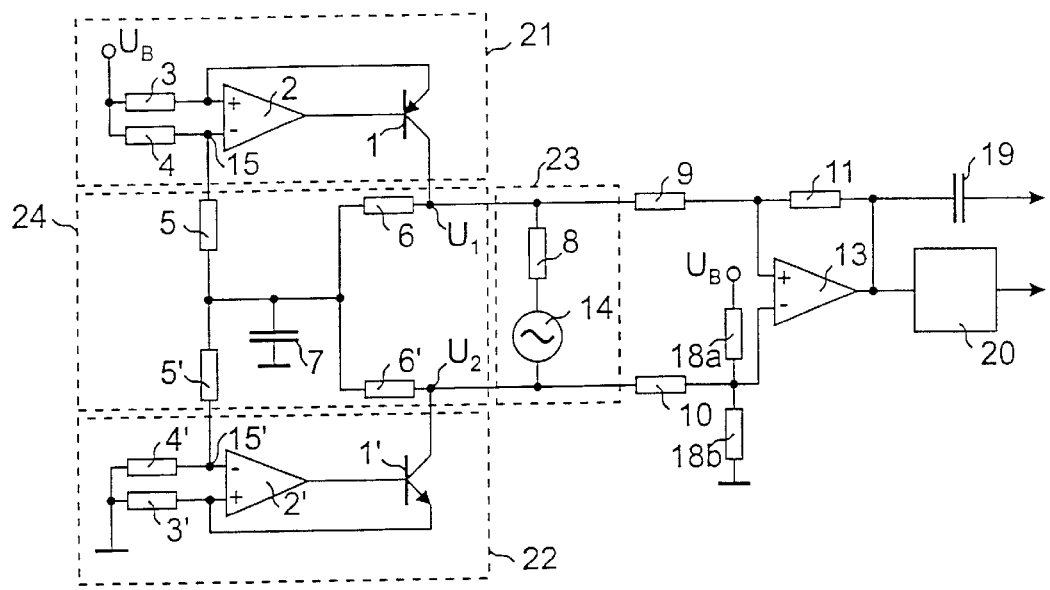

As can be seen from FIG. 1, a sensor arrangement according to the invention comprises two current sources 21, 22 and one countercoupling network 24. The countercoupling network 24 serves to stabilize the operating point of the current sources 21, 22.

The current source 21 comprises a transistor 1, an operational amplifier 2, a first resistor 3, and a second resistor 4. The output of the operational amplifier 2 is connected to the base of the transistor 1. The collector of the transistor 1 forms the output of the current source 21. The emitter of the transistor 1 is connected to the inverting input of the operational amplifier 2. The first resistor 3 is connected on the one hand to the operating voltage UB and on the other is also connected to the inverting input of the operational amplifier 2. The second resistor 4 is connected on the one hand to the input voltage UB and on the other to the non-inverting input of the operational amplifier 2. The non-inverting input of the operational amplifier 2 acts as a summation point 15.

The summation point 15 forms the control input of the current source 21. The non-inverting input of the operational amplifier 2, or summation point 15, is also connected to a third resistor 5 of the countercoupling network 24. The countercoupling network 24 also has a fourth resistor 6, a fifth resistor 5', a sixth resistor 6', and a capacitor 7. The fourth resistor 6 and the third resistor 5, on the one hand, and the sixth resistor 6', fifth resistor 5' and capacitor 7, on the other, are dimensioned such that they each such pair forms a low-pass filter. The third resistor 5 is connected, by its terminal not connected to the summation point 15, to the fifth resistor 5', the capacitor 7, the fourth resistor 6, and the sixth resistor 6'. The collector 7 is connected on its other side to ground potential. The fourth resistor 6 is connected on its other side to the collector of the transistor 1, that is, to the output of the first current source 21.

The second current source 22 is constructed in complimentary form to the first current source 21 and comprises a further transistor 1', a further operational amplifier 2', a further first resistor 3', and a further second resistor 4'. Instead of a pnp transistor 1, however, an npn transistor 1' is used. In addition, the further first resistor 3' and the further second resistor 4' are connected on one side not to the operating voltage UB but rather to ground potential. The non-inverting input of the further operational amplifier 2' acts as a further summation point 15'. The further summation point 15' forms the control input of the second current source 22. The control input of the second current source 22, that is, the further summation point 5', is connected to the terminal of the fifth resistor 5' that is not connected to the capacitor 7. The collector of the further transistor 1' is connected to the terminal of the sixth 25 resistor 6' that is not connected to the capacitor 7.

The collector of the transistor 1, which collector forms the output of the first current source 21, is connected to a first terminal of a secondary coil 23 of a cross duct. The collector of the first transistor 1' forming the output of the second current source 22 is connected to a second terminal of the cross duct 23 is an inductive force sensor, which can be conceived of as comprising an internal resistor 8 and a voltage source 14. The first terminal of the cross duct 23 is also connected to a seventh resistor 9, whose other terminal is connected to the inverting input of an operational amplifier 13 connected as a differential amplifier. The second terminal of the cross duct 23 is connected to an eighth resistor 10, whose other terminal is connected to the non-inverting input of the operational amplifier 13 wired as a differential amplifier. A ninth resistor 11 is connected between the output of the operational amplifier 13 and the inverting input of the operational amplifier 13. The direct voltage applied to the output of the operational amplifier 13 wired as a differential amplifier is a measure for the temperature of the sensor 23 and can be evaluated via a low-pass filter 26. The fourth signal of the sensor, which corresponds to the amplitude of the alternating voltage 42, is out-coupled via a coupling capacitor 25.

Since the first current source 21 and the second current source 22 are constructed in complimentary fashion to one another, the mode of operation of the circuit will be described in terms of the first current source 21.

Via the second resistor 4 and the third resistor 5, a current flows into the summation point 15. This produces a certain voltage drop at the second resistor 4. The voltage drop at the second resistor 4 is compared by the operational amplifier 2 with the voltage drop present at the first resistor 3, and as a result a certain collector current is set in the transistor 1.

The collector of the transistor 1 connected to the first input of the cross duct 23 is intended to be kept at a voltage potential of approximately operating voltage UB. To that end, the voltage U1 present at the collector is fed back to the summation point 15 of the first current source 21, via the fourth resistor 6 and the third resistor 5. The voltage is smoothed by the capacitor 7, so that components of the voltage source 14 of the cross duct 23 and interference are filtered out.

The current carried through the cross duct 23 by means of the first current source 21, or second current source 22, generates a voltage drop at the internal resistor 8. The voltage drop depends on the magnitude of the internal resistance 8. If the internal resistance 8 changes, then the voltage drop generated at it varies as well.

The voltage drop at the internal resistor 8 of the cross duct 23 is amplified by the operational amplifier 13 connected as a differential amplifier. The direct voltage component of the output signal of the operational amplifier 13 connected as a differential amplifier thus represents a measure for the internal resistance 8 of the cross duct 23.

The internal resistance 8 of the cross duct 23 can thus be measured via a low-pass filter, by means of the operational amplifier 13 connected as a differential amplifier. At the same time, the alternating voltage induced in the cross duct 23 and represented as a voltage source 14 is measured via a capacitor, without the signal being substantially adulterated by the floating current source formed of the two current sources 21, 22.

Figure 2:
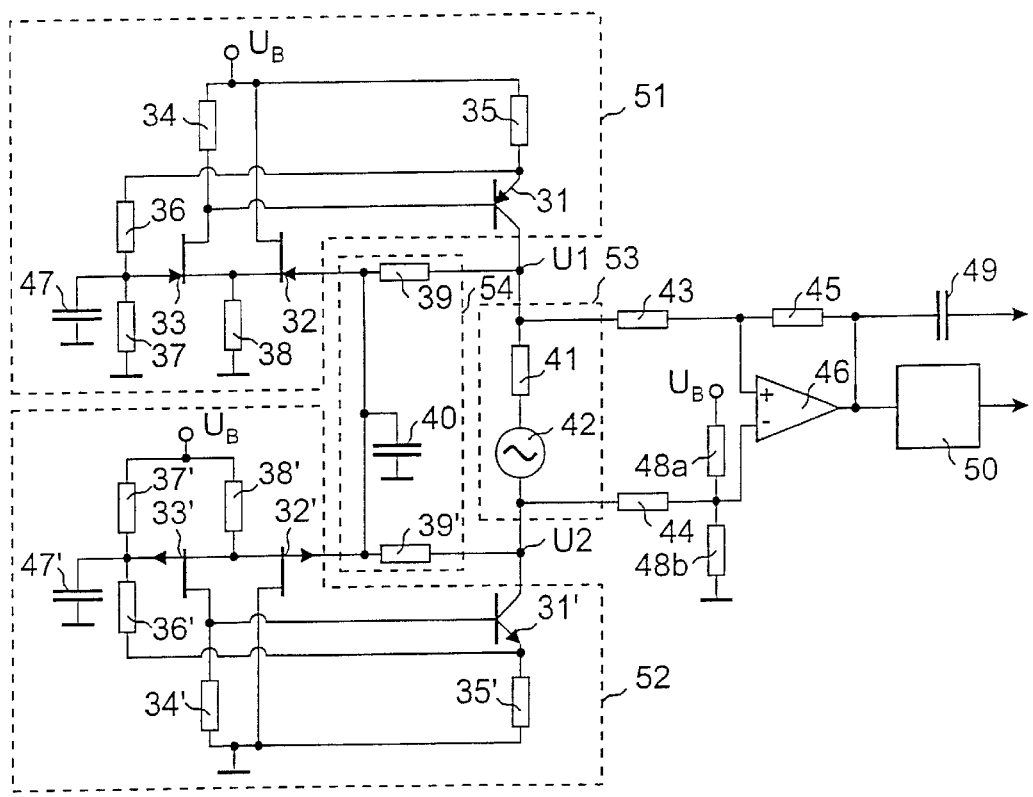
FIG. 2. is a schamatic circuit diagram of a second embodiment of a sensor arrangement according to the invention.

The second embodiment, shown in FIG. 2, of a sensor arrangement of the invention is a variant of the invention shown in FIG. 1. This sensor arrangement comprises two current sources 51, 52 and one countercoupling network 54. The countercoupling network 54 serves to stabilize the operating point of the current sources 51, 54.

The current source 51 comprises a first transistor 31, a transistor 32, a third transistor 33, a first resistor 34, a second resistor 35, a third resistor 36, a fourth resistor 37, a fifth resistor 38, and a first capacitor 47. The first transistor 31 is a pnp transistor; the second transistor 32 and the third transistor 33 are depletion layer field effect transistors. The second transistor 32 and the third transistor 33 are connected as a differential amplifier. The drain terminal of the third transistor 33, which forms the output of the differential amplifier, is connected to the base of the first transistor 31. The collector of the first transistor 31 forms the output of the first current source 51.

The source terminals of the second transistor 32 and of the third transistor 33 are connected to one another, and via the fifth resistor 38 are also connected to ground potential. The drain terminal of the second transistor 32 is also connected to the operating voltage UB, via the first resistor 34. The drain terminal of the second transistor 32 is connected directly to the operating voltage UB. The emitter of the first transistor 31 is connected to the operating voltage UB via the second resistor 35. The emitter of the first transistor 31 is also connected to ground potential, via the third resistor 36 and the fourth resistor 37. The third resistor 36 and the fourth resistor 37 form a voltage divider. Connected to the center tap of the voltage divider formed of the third resistor 36 and the fourth resistor 37 is on the one hand the gate terminal of the third transistor 33 and on the other the first capacitor 47 on one side. On the other side, the first capacitor 47 is connected to ground.

The second current source 52 is constructed in complimentary fashion to the first current source 51 and comprises a further first transistor 31', a further second transistor 32', a further third transistor 33', and further first through fifth resistors 34' through 38', and a further first capacitor 47'. However, instead of a pnp transistor 31, an npn transistor 31' is used. Instead of n-channel transistors 32, 33, p-channel transistors 32', 33' are used. The drain terminal of the further second transistor 31' and the further first and second resistors 34, 35' are also connected not to the operating voltage UB but rather to ground.

The collector, forming the output of the first current source 51, of the first transistor 31 is connected to a first terminal of the sensor 53. The collector, forming the output of the second current source 52, of the further first transistor 31' is connected to a second terminal of the sensor 52. The sensor 53 is inductive force sensor, which can be conceived of as comprising an internal resistor 41 and a voltage source 42. The two terminals of the sensor 53 are also connected to the inputs of an operational amplifier 46 connected as a differential amplifier.

The voltage, applied to the emitter of the first transistor 31 and fed back to the gate terminal of the third transistor 33 via the voltage divider comprising the third resistor 36 and the fourth resistor 37 serves to regulate the output current of the first current source 51. The fed-back signal is smoothed by the first capacitor 47, which prevents an unstable regulating behavior. The countercoupling network 54, comprising a sixth resistor 39 and a further sixth resistor 39' as well as a second capacitor 40 has the same function as in the first embodiment. The voltage U1 applied to the collector of the first transistor 31 is fed back to the gate terminal of the second transistor 32 via the sixth resistor 39. The second capacitor 40, also connected to the gate terminal of the second transistor 32, serves to smooth the fed-back voltage, so that components of the voltage source 42 of the sensor 53 and interference are filtered out.

The voltage dropping at the internal resistor 41 of the sensor 53 is amplified by the operational amplifier 46 connected as a differential amplifier. The direct component of the output signal of the operational amplifier 46 thus represents a measure for the internal resistance 41 of the sensor 53 and can be measured via a low-pass filter 56. The alternating component of the output signal of the operational amplifier 46 is the actual sensor signal and can be measured via a coupling capacitor 55. An independent measurement of two variables is thus possible.

The term "sensor signal processing circuit portion" appearing in the following claims, means the part of the evaluating circuit connected across the sensor terminals, which receives the alternating voltage sensor signal from the sensor and which processes that signal for downstream devices. The sensor signal processing circuit portion includes the operational amplifier whose inputs are connected across the sensor terminals and the capacitor and the low-pass filter device connected to the output of the operational amplifier.

What is claimed is:

1. A sensor arrangement comprising
    a sensor (23; 53) comprising means for generating an alternating voltage sensor signal that depends on a measured variable, said sensor (23, 53) having an internal sensor resistance and two sensor terminals;
    a first current supplying circuit (21, 51) connected to an operating voltage (UB) and to one of said two sensor terminals so as to provide a first output voltage (U1) at said one of said two sensor terminals, said first current supplying circuit (21, 51) having a control input (15);

a second current supplying circuit (22, 52) connected to said operating voltage (UB) and to another of said two sensor terminals so as to provide a second output voltage (U2) at said another of said two sensor terminals, said second current supplying circuit (22, 52) having a control input (15');

a counter-coupling network (24, 54) connecting said control input (15) of said first current supplying circuit (21, 51) and said control input (15') of said second current supplying circuit (22, 52) and also connecting said sensor terminals with each other, said counter-coupling network comprising means for coupling said first current supplying circuit and said second current supplying circuit, so that said output voltages (U1, U2) are set to respective predetermined values; and a sensor signal processing circuit portion comprising an operational amplifier (13, 46) having input terminals connected across said sensor terminals and an output terminal, a low-pass filter (20, 50) connected to said output terminal of said operational amplifier and having a filter output signal indicative of the internal sensor resistance and a capacitor (19, 46) connected to said output terminal of said operational amplifier to generate an alternating output signal having an amplitude dependent on said measured variable;

whereby said sensor is at an ungrounded floating potential so that common-mode interference reaching said operational amplifier is compensated.

2. The sensor arrangement as defined in claim 1, wherein said counter-coupling network (24, 54) couples said first current supplying circuit and said second current supplying circuit, so that said output voltages (U1, U2) are approximately half of said operating voltage (UB).

3. The sensor arrangement as defined in claim 1, wherein said counter-coupling network comprises counter-coupling resistors (6,6'; 39, 39') connected in series across said sensor terminals and a capacitor (7, 40) connected to a node between said counter-coupling resistors on one side of the capacitor and to ground on another side of the capacitor, and wherein said node is electrically connected to said control inputs of said first and second current supplying circuits.

4. The sensor arrangement as defined in claim 1, wherein said counter-coupling network (24,54) includes a low-pass filter means (6, 6, 7; 39', 40) having a limit frequency below a frequency of said alternating voltage produced by said sensor.

5. The sensor arrangement as defined in claim 1, wherein said internal sensor resistance depends on a temperature of said sensor.

6. The sensor arrangement as defined in claim 1, wherein said sensor (23, 53) is a cross-duct for measuring a force applied to said sensor.

* * * * *